United States Patent

Davis et al.

[15] 3,685,930
[45] Aug. 22, 1972

[54] APPARATUS FOR CONTINUOUSLY MOLDING SHEET MATERIAL

[72] Inventors: Leonard P. Davis; Robert M. Elliott, both of Kingsport, Tenn.

[73] Assignee: Kimberly-Clark Corporation
[22] Filed: May 27, 1970
[21] Appl. No.: 40,952

[52] U.S. Cl. ..................425/71, 264/90, 425/223, 425/363
[51] Int. Cl. ..............................................B29c 17/04
[58] Field of Search ......18/4 B, 4 C, 5 A, 15 S, 15 R, 18/15 F, 15 V, 19 F; 264/47, 90, 91, 210, 214, 216

[56] References Cited

UNITED STATES PATENTS 1,157,149  10/1915  Conger........................18/15 S
3,099,043  7/1963  Held........................18/19 F X Primary Examiner—J. Spencer Overholser
Assistant Examiner—Lucius R. Frye
Attorney—Cecil D. Quillen, Jr. and John F. Stevens

[57] ABSTRACT

Apparatus is disclosed for producing molded sheet material. An endless belt-type mold is entrained over rolls, providing an upper run and a catenary. Molten thermoplastic material is extruded onto the upper run and caused to assume the configuration of the belt mold by the action of vacuum applied from beneath the belt before the molten material solidifies. The molded sheet material is stripped from the belt mold near the end of the upper run, and apparatus is provided fro efficiently cooling the catenary of the belt mold before molten material is applied again.

5 Claims, 4 Drawing Figures

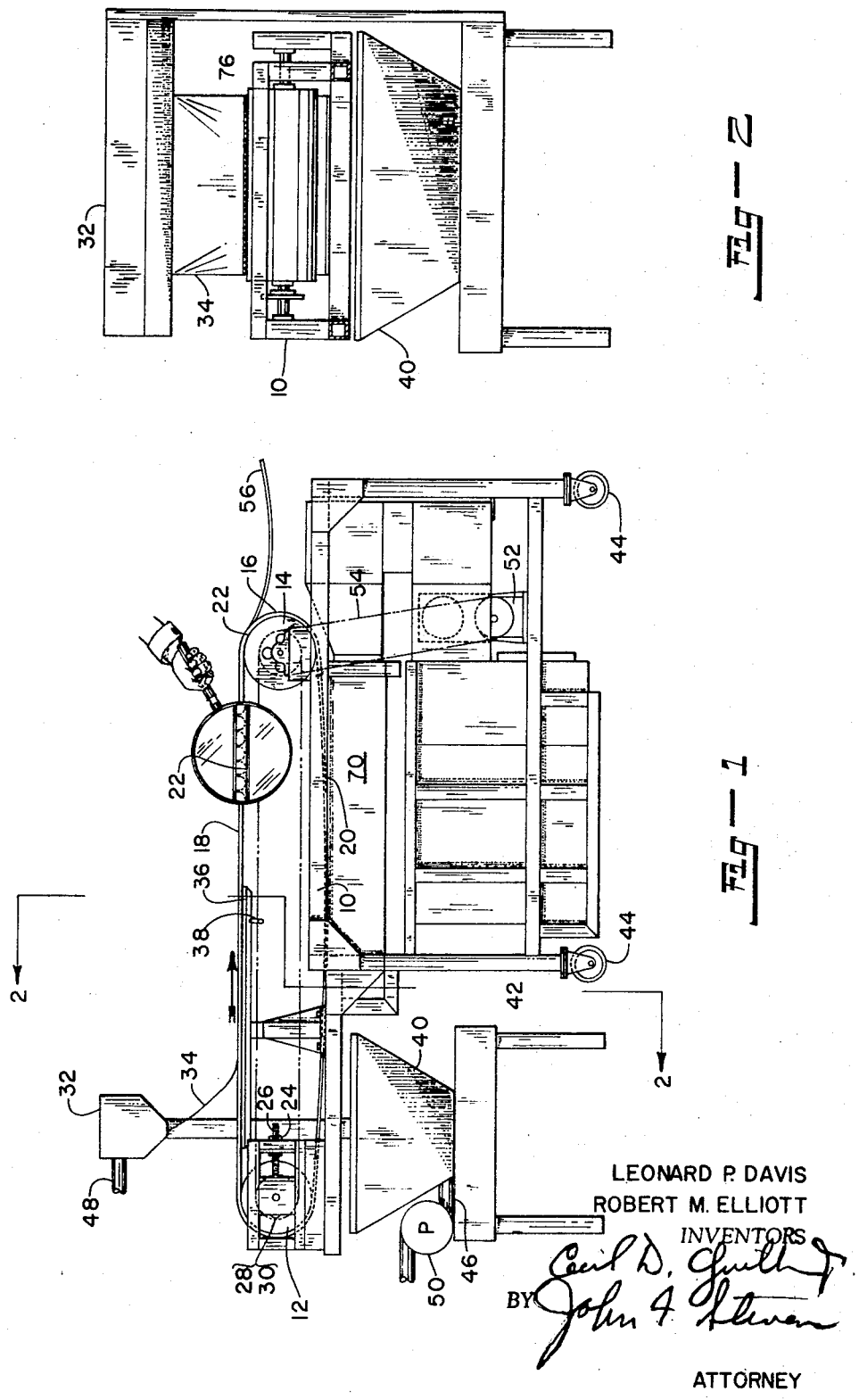

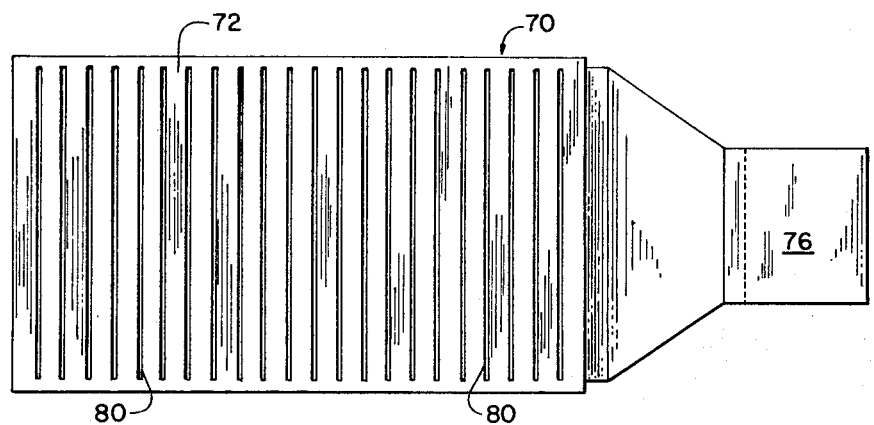
Fig—4
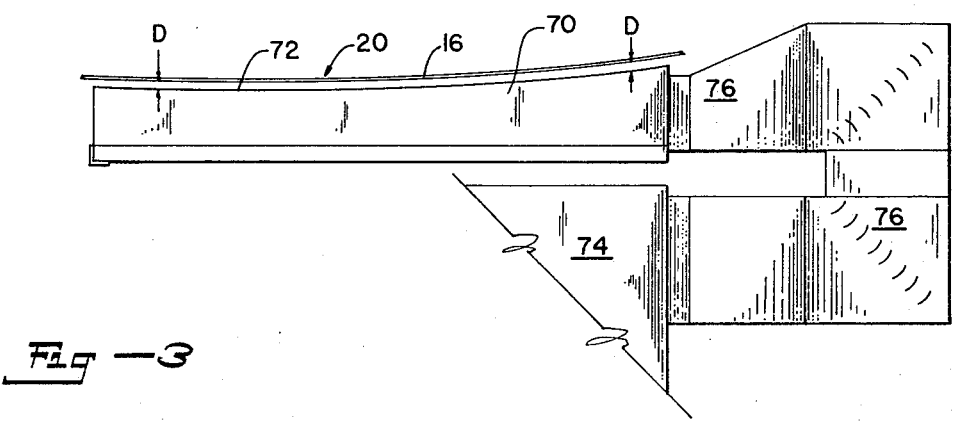
Fig—3
LEONARD P. DAVIS
ROBERT M. ELLIOTT
INVENTORS
BY
ATTORNEY

APPARATUS FOR CONTINUOUSLY MOLDING SHEET MATERIAL

This invention relates to the continuous molding of thermoplastic material, and more specifically, this invention relates to apparatus for molding continuous sheets of thermoplastic material into various three-dimensional configurations from a falling curtain of molten material.

Conventional methods and apparatus for producing three-dimensional products from sheet material include those in which the sheet material is embossed usually after the application of sufficient heat to soften the material, so that it can easily be thermoformed. The present invention provides a novel apparatus for producing a continuous sheet of molded material by extruding a falling curtain of the thermoplastic material directly onto an endless belt-type mold traveling below a film die. In this manner, the necessity of first making the flat sheet is eliminated.

According to this invention, apparatus is provided for supporting a flexible, endless belt-type mold for travel along a predetermined path. A driving roll is supported at one position on a suitable frame and an idler roll spaced therefrom. The belt is entrained over the two rolls thereby providing upper and lower runs. A curtain-type extruder or film die is positioned above the upper run at a position remote from the end of the upper run. Means are provided for drawing a vacuum under and through the belt mold at a position slightly downstream from the extruder. Material formed in the belt mold is stripped therefrom near the end of the upper run. Also, according to the present invention, means are provided for cooling the belt mold between the point where the material is stripped off and the point where the falling curtain of extruded material contacts the belt mold. Significant advantages are obtained by cooling the belt mold at this position. Increased production rates are achieved by the apparatus according to this invention. Conventional heat removal methods such as passing the belt mold over chill rolls cannot be used effectively because of the high thermal resistance of the belt mold material, which is usually a very flexible silicone rubber. Free connection heat transfer severely limits production rates, or requires the use of extremely long belts. Forced convection cooling with air or gas blowing parallel to the belt is little better than free convection because much of the mold surface is not exposed to the air stream due to the configuration of the mold. The otherwise sheltered surfaces can be reached and relatively large heat transfer coefficients obtained by using two-dimensional air jets directed generally perpendicular to the belt mold.

It is an object of this invention to provide apparatus for continuously manufacturing molded sheet material directly from an extruded falling curtain of molten thermoplastic material.

It is a further object of this invention to provide novel means for adequately cooling the belt mold between the point where the molded sheet material is stripped off and the point where the falling curtain contacts the mold, thereby considerably shortening the required length of the belt mold.

These and other objects of the invention will become apparent from the following disclosure with reference to the drawings.

In the drawings which illustrate a specific embodiment of the invention:

FIG. 1 is a side elevation view showing a continuous molding machine according to our invention;

FIG. 2 is a section view taken substantially along line 2—2 of FIG. 1;

FIG. 3 is an enlarged elevation view of the cooling apparatus according to our invention; and FIG. 4 is an enlarged plan view of the cooling apparatus.

Referring to FIGS. 1 and 2, frame 10 has rotatably mounted thereon cylinders 12 and 14 over which a continuous belt-type mold 16 is entrained, having an upper run 18 and catenary or lower run 20. The belt-type mold 16 is of a durable, flexible material such as, for example, silicone rubber. To prevent stretching and consequent distortion of the mold 16, it is usually desirable to attach a backing belt 22, which may be of fabric or similar material. The mold 16 and backing belt 22 are connected, such as by adhesive connection or stitching. Means are provided for finely adjusting the distance between rolls 12 and 14 which include the screw-type adjuster 24. Horizontal movement of roll 12 can be achieved by turning the screw 26 which is connected to the bearings 28 and 30 of roll 12.

An extruder head 32 is provided above the upper run 18 of the belt mold 16 for extruding a molten curtain 34 of thermoplastic material onto the surface of the belt mold 16 near the beginning of upper run 18. Molten thermoplastic material, for example, polyethylene having a melt temperature of 350°–425°F., is supplied to the extruder head 32 from supply means (not shown). The curtain 34 falls by gravity to the surface of the mold 16, and is immediately molded to the configuration of the belt mold by means of vacuum being applied from beneath the belt mold 16 and the backing fabric 22. The belt mold, although of a non-porous material such as silicone rubber, is perforated at selected intervals for the transmittal of vacuum through it. Generally, the perforations are at the base of each of the depressions in the belt mold. Vacuum is applied to the underside of the belt mold 16 and backing fabric 22 through suction box 36 over which the upper run travels. Suction box 36 is connected to a source of vacuum (not shown) through conduit 38.

Means are provided for extruding the curtain 34 directly into catch basin 40 for start-up, etc., when it is not desired to extrude the curtain onto the belt mold 16. Frame 10, which carries the belt mold 16, and frame 42, which carries the extruder head 32, and catch basin 40 are movable relative to each other. This relative movability may conveniently be established by means of rollers 44 which support the frame 10. Thus, for start-up, frame 10 may be moved to the right, as shown in FIG. 1, allowing extrusion into the catch basin 40. Material extruded into the catch basin 40 can then be recirculated through conduits 46 and 48, back to the extruder head 32 by means of the pump 50.

As the curtain 34 is extruded onto the belt mold 16, movement of the belt in the direction of the arrow is accomplished by means of frictional engagement of the backing fabric 22 with driving roll 14. Roll 14 is driven by means of motor 52 through belt 54 at a predetermined speed, depending upon the characteristics of curtain 34 and the desired thickness of the molded sheet 56. As the belt 14 carrying the extruded curtain 34 thereon passes over vacuum box 36, the molded sheet material 56 is vacuum formed and solidified as it continues to move along the upper run. As the material 56 reaches the end of upper run 18 and enters the arc over roll 14, it is stripped from the mold. Stripping the material at this position is greatly facilitated by the depressions in the mold stretching and opening slightly when passing through this arc. The molded sheet material 56 is then passed over idler rolls (not shown) and wound in a roll (not shown).

As the belt mold 16 is subjected to intense heat in carrying the curtain 34 on its upper run 18, means are provided over a portion of the lower run 20 for cooling the belt mold 16 between the point where molded sheet material 56 is stripped and the point where molten curtain 34 contacts the belt mold. As it is contemplated that the molded sheet material may be laminated with other material while it is on the upper run of the belt mold and before it is completely solidified, the present invention is a marked improvement over conventional apparatus. The forced convection cooling apparatus permits higher production speeds with shorter belts, thus resulting in a savings in cost as the mold belts are expensive to fabricate. The cooling apparatus according to this invention permits the entire surface area of the mold to be efficiently cooled even with the highly irregular configuration of the belt mold, in which some of the surfaces may be approximately perpendicular to the plane of the belt. These difficulties are overcome by the use of impinging two-dimensional air jets directed perpendicular to the belt mold 16 in a specific manner.

The relative position of the belt mold 16 and the cooling air chamber 70 is shown in FIGS. 1 and 2. In FIG. 3, however, an enlarged view of the cooling air chamber 70 is presented. The cooling air chamber 70 is provided with a nozzle plate 72 generally matching the contour of the catenary of lower run 20. The nozzle plate 72 is spaced from the belt mold 16 a generally constant distance, D. Cooling air is supplied from an air conditioning unit 74 through duct 76 into the chamber 70.

In FIG. 4, a plan view of the cooling air chamber 70 is shown having a plurality of jets 80 extending substantially across the width of the chamber 70. The jets 80 are of uniform width and extend in a generally perpendicular direction to the direction of travel of belt mold 16. The jets are actually in the form of slots provided in the nozzle plate 72 of chamber 70. Cooling air is discharged through the nozzles 80 against the belt mold 16. Large heat transfer coefficients are achieved with relatively small quantities of air. The jets may be oriented so as to direct the cooling air up to 90° from the perpendicular to the plane of the belt, with the preferred orientation being substantially perpendicular to the belt mold 16. The nozzles 80 may be oriented 90° from the direction of travel of the belt mold 16, with the preferred orientation being substantially perpendicular to the direction of belt travel.

As stated hereinbefore, for efficient cooling of the belt mold 16, the jets 80 should be spaced a distance D from the lower run of the belt mold. This distance may be approximately three-eighths inch to approximately 1½ inches. The preferred distance is approximately seven-eighths inch.

Although air has been referred to herein repeatedly as the cooling medium, it is contemplated that other gasses may be used with equally good results.

Cooling can be accomplished to any desired degree depending on the operating conditions of the apparatus. For example, the following conditions represent a typical operation:

Length of belt mold—approximately 15 feet
Width of belt mold—32 inches
Diameter of rolls 12 and 14—8.3 inches
Extrusion rate—175 lb./hr.
Width of extruder nozzle—32 inches
Speed of belt—55 ft./min.
Length of cooling air chamber—48 inches
Number of nozzles—23
Size of nozzles—26 × ⅛ inches
Capacity of refrigeration unit—3 tons, 1,200 CFM
Temperature of molten thermoplastic material—375°F.

The invention has been described in detail with particular reference to preferred embodiments thereof, but it will be understood that variations and modifications can be effected within the spirit and scope of the invention.

We claim:

1. Apparatus for continuously molding sheet material comprising, in combination
   a. an endless, flexible belt mold having an irregular molding surface integrally formed therein and a plurality of openings in depressed areas thereof,
   b. means for supporting and advancing said belt mold in a position defining an upper run and a catenary,
   c. a film die adapted to extrude a molten curtain of thermoplastic material onto the upper run of said belt mold,
   d. means for applying a vacuum to the underside of the belt to communicate with the openings in said belt at a position downstream from said extruder,
   e. means for withdrawing molded sheet material from the end of the upper run, and
   f. means for cooling said belt mold over at least a portion of its catenary including an air distribution chamber having an upper side formed of a nozzle plate, a series of generally transverse slits formed in said nozzle plate for directing air in a direction generally perpendicular to said belt mold, said nozzle plate conforming generally to the catenary of the lower run of said belt.

2. Apparatus according to claim 1 in which said irregular molding surface includes portions extending generally perpendicular to the plane of the belt mold.

3. Apparatus according to claim 1 in which said air distribution chamber extends over a major portion of the length of the catenary of said belt mold and the nozzles extend substantially the width of the belt mold.

4. Apparatus according to claim 1 in which each of the nozzles is located between three-eighths inch and 1½ inches from the catenary of said belt.

5. Apparatus according to claim 1 which includes a catch basin positioned below the lower run of said belt mold and under said extruder, and said extruder and catch basin being movable relative to said belt mold whereby molten thermoplastic material may be extruded directly into said catch basin.

* * * * *